Sept. 13, 1955      W. E. MARTIN      2,717,707
TILTING PLATFORM TRAILER
Filed June 27, 1952      2 Sheets-Sheet 1
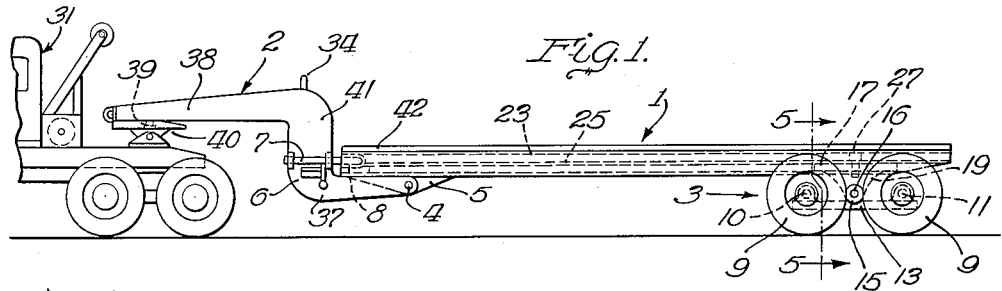
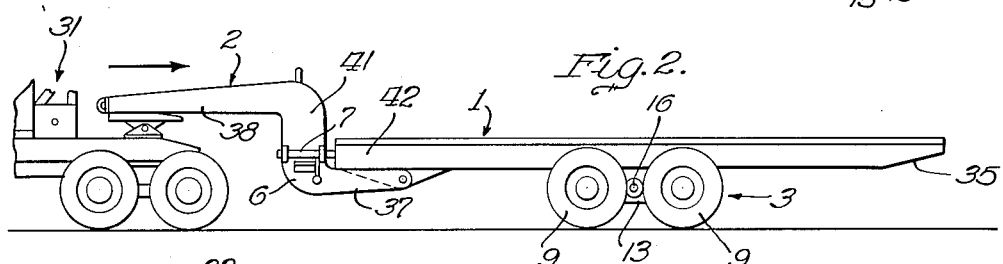
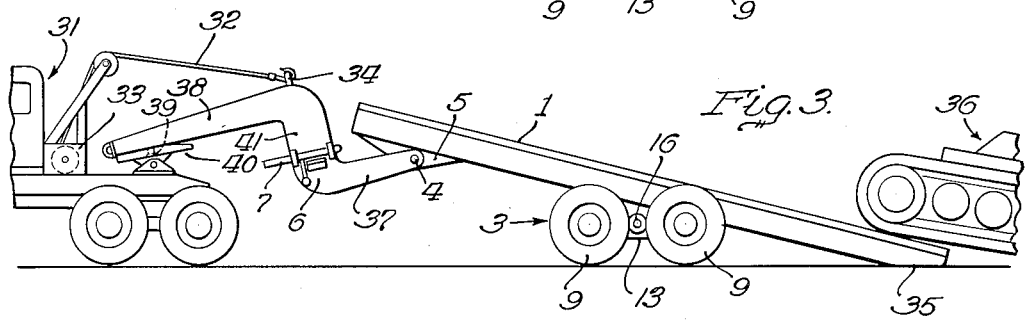
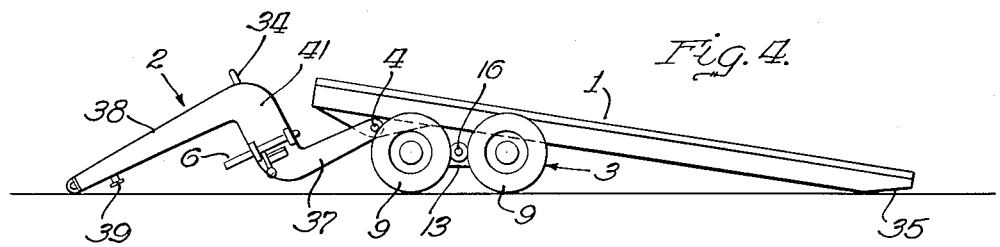
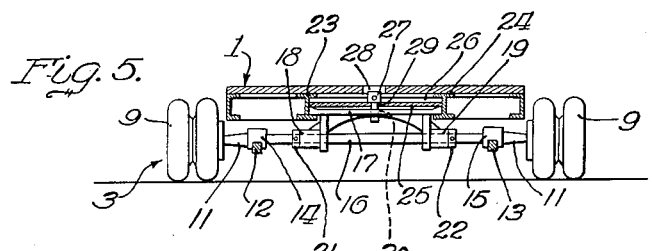
INVENTOR.
William E. Martin
BY
Eberhard E. Whitley
Atty.

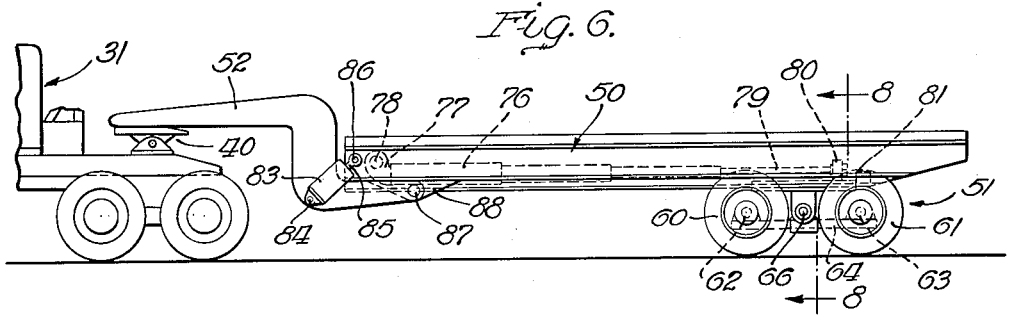
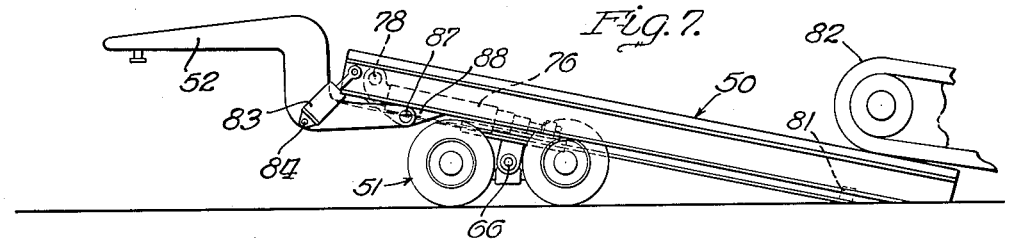
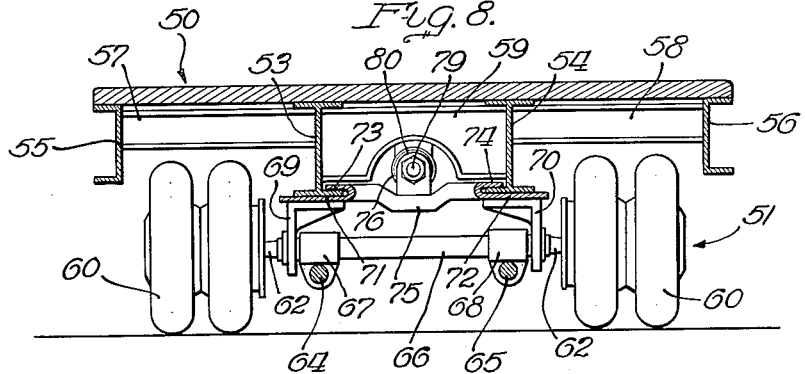
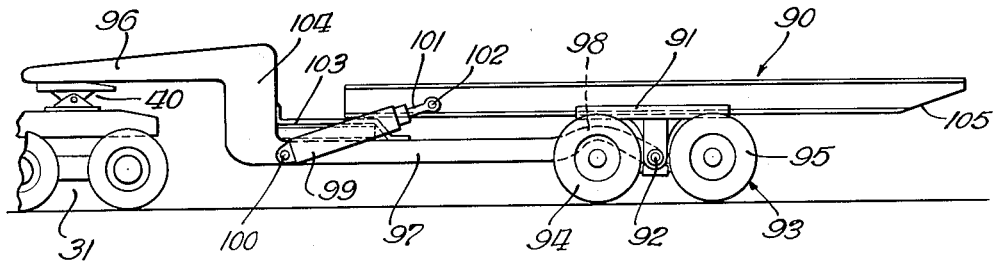

United States Patent Office 2,717,707
Patented Sept. 13, 1955

2,717,707

TILTING PLATFORM TRAILER

William E. Martin, Kewanee, Ill.

Application June 27, 1952, Serial No. 295,971

15 Claims. (Cl. 214—505)

This invention relates to an equipment hauling trailer incorporating means to facilitate the loading and the unloading thereof respectively with ease and with efficiency.

More specifically this invention is directed to a tilting platform trailer to load and unload equipment directly onto and off of the platform and wherein the platform is quickly converted into a complete ramp for such purposes.

Various arrangements have been used in the past to enhance the utility of trailers and particularly in loading and unloading such units. Some of the more common and simpler structures are made for use with removable ramps; while more expensive and costlier trailers may be equipped with folding goosenecks and some with power operated folding goosenecks to load or unload over the front end of the hauling bed or platform.

One of the objects of the present invention is to provide a bed or platform and wheel combination that are capable of bodily shifting relatively to each other to establish a teeter position for the platform upon the wheels to transform the platform into a loading ramp.

Another object of the present invention is to provide a trailer having a wheel carriage that permits bodily shifting of the platform relatively to the carriage through means such as the trailer hauling tongue for movement into a position to allow tilting of the platform with one end thereof disposed downwardly for engagement with the ground or road to load or unload the platform while occupying the tilted relationship upon the wheel carriage.

Another object of this invention is to provide a selectively shiftable wheel assembly in connection with a platform and wherein an articulate gooseneck or tongue is employed to haul the trailer and to cooperate in bringing about a tilting of the platform for loading without requiring removal of the gooseneck or tongue from the tractor or other towing vehicle.

Another object of this invention is to provide an articulate hauling tongue and trailer bed wherein the latter is tiltably arranged with respect to a tandem wheel carriage or other wheeled means and wherein releasable latching or locking means is used to fix the tongue in a given hauling relation with respect to the bed or load carrying platform.

A further object of the invention is to provide cooperative latching or locking means on the platform and wheeled carriage to facilitate keying or fixing the carriage in a given relation with respect to the length of the platform or bed to either establish the hauling relationship of the unit or to bring about one or more teetering relationships for loading or unloading such unit.

It is another object of the present invention to provide power means interposed between the trailer platform and the shiftable trailer carriage to adjust the relative positions between such platform and carriage to obtain certain selected loading and unloading positions between these two units.

It is still a further object of the present invention to introduce power operated means that will function to control the movements of the gooseneck or tongue with respect to the tiltable platform.

And a further object of the present invention is to provide a trailer which has a platform that is relatively shiftable with respect to a supporting wheeled means and wherein a gooseneck or tongue is attached directly to the wheeled means structure together with power means interposed between the platform and the gooseneck or tongue to provide a trailer wherein the platform is shiftable both with respect to the wheeled means and with respect to the tongue. In this construction, the power means is used for disposing the platform into a tiltable position upon the wheeled means for loading and unloading, and the same power cylinder can be used for holding the platform in transportable position with respect to the gooseneck or tongue of the trailer.

Other objects and advantages relating to the present invention shall hereinafter appear in the following detailed description having reference to the accompanying drawings forming a part of this specification.

In the drawings:

Fig. 1 is a side elevational view of a trailer constructed according to the principles of the present invention and as such trailer appears when arranged for hauling and connected with a pulling vehicle;

Fig. 2 is another side elevational view of the trailer as it apears when the platform has been shifted relatively to the releasably connected wheel carriage by the tractor or hauling vehicle;

Fig. 3 is a side elevational view illustrating the platform as tilted in relation to the wheeled carriage and in contact with the trailer supporting surface;

Fig. 4 is another side elevational view of the trailer showing a further cooperative arrangement of the platform and wheeled carriage for purposes of loading and/or unloading the trailer;

Fig. 5 is a cross sectional view taken transversely of the trailer and substantially as taken along the line 5—5 in Fig. 1 and looking rearwardly as indicated by the arrows;

Fig. 6 is a side elevational view of a modified arrangement of trailer wherein power means are introduced for controlling the relative positions between the platform and the wheeled means of the trailer, this construction also incorporating a power means that is connected between the platform and the gooseneck or hauling tongue thereof;

Fig. 7 is a view of the trailer illustrated in Fig. 6 but as the same appears in loading or unloading position and with the gooseneck also prepositioned in a given relation with respect to the platform of the trailer;

Fig. 8 is a transverse, cross sectional view taken substantially along the line 8—8 in Fig. 6; and Fig. 9 is another modified arrangement illustrating a side elevational view of a trailer wherein power means are interposed between the platform and the tongue and wherein the tongue is directly connected to the wheeled means which is arranged for shiftably supporting the platform.

The trailer of this invention and as seen in Fig. 1, generally comprises a platform 1, a hauling hitch structure or gooseneck 2 and a wheeled carriage 3. The gooseneck 2 is pivotally connected upon a cross shaft or pin 4 carried by one or more brackets 5 secured to the platform 1 of the trailer. A latch or locking means 6 is mounted upon each side of the gooseneck 2 and each means includes a bar or rod 7 that is shiftable into a socket 8 carried by the front end of the platform 1 and in line with the bar or rod 7.

The wheeled carriage 3 may be of any general type of running gear construction but as one example thereof, reference may be had to Figs. 1 and 5. The wheeled means shown is a tandem axle arrangement having wheels 9 carried upon axles 10 and 11, the latter being connected by walking beams 12 and 13 each carrying central bracket structures 14 and 15 that connect with a mounting shaft 16. Shaft 16 is connected with the trailer by means of a slidable arrangement including a plate 17 having depending bearing brackets 18 and 19 to receive the mounting shaft 16. Suitable means such as collars 21 and 22 hold the axle structure in proper lateral relationship with respect to the platform 1 of the trailer.

Plate 17 is carried in a guideway or trackway connected with the platform 1. Such a trackway may be formed by the lower horizontal flanges of adjacent platform I-beams 23 and 24 and a superimposed baffle 25 connected with cross beams 26 secured to the adjacent I-beams 23 and 24. Plate 17 is, therefore, capable of sliding movement along the platform, or vice versa, the platform 1 can be moved relatively to the wheeled carriage 3.

Any form of releasable locking means may be used to prevent relative movement of the platform 1 and wheeled carriage 3 to hold these units in any given selected relationships with respect to each other. One means may employ a removable lock pin 27 that can be dropped through an appropriate opening 28 in the bed or platform 1 to pass the pin through aligned holes 29 and 30 formed in the baffle 25 and plate 17 respectively, with the head of the pin holding the pin in place as shown in Fig. 5. Any number of holes such as 28 may be provided along the length of the platform 1 and in baffle 25 to enable locating the wheel carriage 3 in any one of a selected number of positions intermediate the length of the trailer platform 1 depending upon the conditions of use of the trailer unit.

With the described arrangement, it is possible to set up the trailer into operative running position by the location of the hole 28 at the rear end of the platform baffle 25 to lock the wheeled carriage in the position shown in Fig. 1. By latching bar 7 of the gooseneck with the head end of trailer socket 8, a rigid normal trailer construction results.

To convert the trailer for loading equipment, pin 27 is removed, and by blocking or braking the wheels 9 of the carriage 3, tractor 31 can be backed to shove the platform 1 rearwardly to a second selected pin hole location in the baffle wherein the pin 27 can then be used to lock the platform and carriage as shown in Fig. 2. Subsequently latch bar 7 can be retracted to the position shown in Fig. 3, and a cable 32 from the tractor winch 33 may be hooked into an eye 34 on the gooseneck 2 to tilt the platform 1 as shown in Fig. 3. To break down or to reduce the rear platform height, the bottom rear portion of the platform may be beveled or tapered upwardly and rearwardly as at 35 giving a better loading approach to the platform at the point of ground contact.

The platform tilts upon the axle framework shaft 16, and when a vehicle such as 36 is moved upon the platform, the latter will tilt back to its horizontal position as the vehicle weight is distributed over the wheel carriage location. Once part of the load or the vehicle such as 36 is upon the rear end of the platform, the cable 32 can be unhooked unless the cable is used to check the return tilt of the platform into its horizontal position and upon the tail piece 37 of the gooseneck 2.

Attention is further directed to the gooseneck employed. This structure comprises a hitch tongue 38 having a hitch pin 39 for latching engagement with the tiltable fifth wheel 40 of the tractor 31. The hitch tongue 38 and the tail piece 37 are vertically separated by the connecting frame 41 of the gooseneck 2 and the latching structures 6 are preferably carried on this frame.

With the location of the pivot shaft or pin 4 rearwardly of the front edge of the platform 1, the forward portion 42 of the platform saddles or nests upon the tail piece 37 of the gooseneck when the trailer is arranged as in Figs. 1 and 2. And this holds true as long as the platform weight at the head end keeps the platform portion 42 down upon the tail piece 37. As in Fig. 1, whether loaded or not, parts 42 and 37 will normally remain in coactive seated relationship and whether latched or not at 6.

The use of latch means 6 is desired, however, and more specifically during the maneuvering of the platform and wheel carriage into other correlated positions, one of which is shown in Fig. 2.

In Fig. 4, the wheeled carriage 3 has been moved to the forward end of the trailer with the gooseneck 2 dropped to the ground. In either arrangements illustrated in Fig. 2 and 4, the tractor can be used to draw the platform 1 forward relatively to the wheels 9 by blocking or braking the latter. By relocating pin 27 in hole 28 in the baffle 25 and by latching the gooseneck to the platform, the whole unit again assumes a normal trailer construction such as appears in Fig. 1.

This trailer also has the further advantage of being maneuverable in smaller areas and between obstructions other than the normal fixed and rigid trailer units having fixed wheel carriage connections. With the present construction, moving the wheeled carriage to a position intermediate the length of the platform, as in Fig. 2, provides a trailer arrangement having a smaller turning radius and obviously a faster and sharper swinging bed or platform. The platform may in this manner be more quickly swung and better employed and positioned in loading and unloading operations than is possible with fixed bed and carriage combination trailers of the kind now generally in use.

Referring now to the modified construction of trailer illustrated in Figs. 6, 7 and 8, this trailer comprises a platform 50 supported by a wheeled carriage 51 and having a gooseneck or hitching tongue 52 which is adapted for connection with a fifth wheel 40 of a tractor 31. The platform 50 as best illustrated in Fig. 8 comprises a composite structural bed having central longitudinal I-beams 53 and 54 and longitudinal channels 55 and 56 spaced from the I-beams 53 and 54 and disposed at the lateral sides of the trailer bed or platform 50. Suitable cross beams such as 57 and 58 connect the respective I-beams and channels, while a central transverse structure such as 59 connects the I-beams 53 and 54.

The wheeled means 51 may be of a conventional type using the tandem wheels 60 and 61 carried upon axles 62 and 63 with these axles connected by the walking beams 64 and 65 that are suitably suspended from a central supporting axle 66 by means of the brackets 67 and 68. Another pair of brackets 69 and 70 connect with the central supporting axle or shaft 66 and connect with a pair of bed plates 71 and 72 which have channel ends 73 and 74 for engaging over the lower inner legs of the I-beams 53 and 54 for sliding movement therealong. One or more cross braces 75 connect the bed plates 71 and 72.

With this construction, the brackets 69 and 70, together with the bed plates 71 and 72, plus the cross braces 75 and with the use of the channels 73 and 74, provide a sliding structure whereby the wheeled carriage 51 can be moved longitudinally with respect to the bed or platform 50. This sliding movement is controlled by means of a power means in the form of a telescoping hydraulic cylinder 76 that has a bracket 77 pivotally connected at 78 with a forward portion of the platform 50. This telescoping hydraulic cylinder comprises a plurality of expanding tube sections ending with a rod 79 that is bolted or otherwise secured to a lug 80 connected with one of the cross braces 75 of the sliding unit hereinbefore described. When the hydraulic power unit 76 is substantially completely expanded, the bed plates 71 and 72 are positioned in abutting engagement against laterally positioned stops 81 that are connected with portions of the I-beams 53 and 54, these stops 81 providing a means for definitely determining transverse alignment of the wheeled unit 51 with respect to the platform 50, thereby insuring perfect tracking of the respective wheels of the tandem unit.

The hydraulic cylinder 76 is preferably double acting and may be retracted as shown in Fig. 7 to position the wheeled unit 51 adjacent the forward end portion of the platform 50 for the purpose of loading a vehicle 82 or other means as the case may be. This construction, therefore, provides a power means to definitely control the relative position of the platform with respect to the wheeled means and also introduces the structure whereby the wheeled means can be brought to a definite transverse alignment with respect to the platform to insure perfect tracking of the wheels in the direction of travel of the trailer.

The construction in Figs. 6 to 8 inclusive also includes a hydraulic cylinder 83 that is pivotally carried at 84 upon the gooseneck or tongue 52 and which has a piston rod 85 that is pivotally connected at 86 to the forward portion of the platform 50. With this particular power cylinder 83, it is possible to definitely position the tongue or gooseneck in any given relationship with respect to the platform 50. Tongue 52 is pivotally supported at 87 on a bracket 88 which is connected to an underportion of the trailer bed 50 in any desirable manner. This trailer, therefore, permits the use of a cylinder such as 83 for lowering or raising the forward end of the tongue 52 to position the same in a given relation above the ground and also in a position wherein a tractor such as 31 can be backed up to latch the tongue to the fifth wheel 40. The cylinder 83 is also preferably a double acting unit so that the relative positions between the tongue and the trailer bed may be changed in either direction of the operation of the cylinder.

The trailer construction illustrated in Fig. 9 generally comprises a trailer bed or platform 90 which is slidably carried upon a bracket structure 91 that is pivoted upon the cross shaft or axle 92 of the wheeled carriage 93 having sets of wheels 94 and 95 constructed much the same as that previously described in connection with Figs. 6 to 8.

This particular trailer includes a gooseneck structure having a hitch tongue 96 arranged for connection with a fifth wheel 40 of a tractor 31, and this tongue is provided with a rearwardly extending draw bar 97 that is upwardly looped at 98 to clear the front axle of the tandem wheel structure, and is also pivotally connected with the cross shaft 92 of the tandem wheeled unit 93.

A power cylinder 99, preferably of the double acting type, is preferably connected at 100 to one portion of the gooseneck or hitch tongue 96, and this cylinder has a piston rod 101 which is pivotally connected at 102 to the forward end of the platform 90. Although the cylinder 99 may be used to definitely locate the relative vertical positions between the forward end of the platform 90 and the tailpiece 97 of the hitch tongue 96, it is preferable to introduce a support 103 which is suitably connected between the tailpiece 97 and the vertical portion 104 of the hitch tongue 96.

With this particular arrangement, the entire trailer may be kept mounted upon the tractor as shown in Fig. 9, and the operation of the cylinder 99 will move the platform rearwardly with respect to the bracket 91 of the tandem structure 93, this same action also causing the platform to tilt in a clockwise direction to bring the bevelled portion 105 of the platform into engagement with the ground, the forward end of the same platform obviously moving upwardly with respect to the tailpiece 97 of the gooseneck. This will bring the platform into loading and unloading position. After the platform is loaded or unloaded, the same can be returned substantially into the position shown in Fig. 9 by the retraction of the parts of the cylinder 99.

Certain changes in the exact construction of the trailer and its various mechanisms and modifications as herein disclosed and described are contemplated without departing from the fundamental concept of the present invention. Such further modifications shall, however, be governed by the breadth and scope of the following claim or claims as directed to the present invention.

What I claim is:

1. In a trailer, a platform, a wheeled carriage, and hitch means pivotally connected with said platform to secure the platform to a towing vehicle comprising a tongue member, a tail piece member, and an upright to join said members in vertically spaced relation with respect to each other with said tongue member above the level of the platform and said tail piece member beneath the underside of said platform and pivotally connected thereto, said platform having a guideway arranged along one direction of said platform and extending rearwardly thereof from a forward position aligned with said upright portion of said hitch means, and said carriage having slide means connected for movement along said platform guideway whereby to change the relative location of said wheeled carriage along said guideway and with respect to the platform, and locking means to fix the position of said slide means in a predetermined location along the platform guideway, and operable means pivotally interconnecting the forward portion of said platform with said hitch means to solely manipulate the latter and to bodily tilt said platform through said hitch means upon said wheeled carriage.

2. In a trailer, a platform, a wheeled carriage, and hitch means to secure the platform to a towing vehicle, said platform having a guideway arranged along one direction thereof, and said carriage having slide means connected for movement along said platform guideway whereby to change the relative location of said wheeled carriage along said guideway and with respect to the platform, and locking means to fix the position of said slide means in a predetermined location along the platform guideway, and operable means connected with said hitch means and said platform to bodily tilt said platform upon said wheeled carriage, said platform having an upwardly and rearwardly sloping bottom portion at the rear end thereof adapted for direct engagement with the ground and to reduce the overall height of the platform when disposed in tilted relation by said operable means and at its ground contacting rear loading edge.

3. A mobile trailer comprising a platform, a wheeled structure for said platform including an axle, said structure having a transverse shaft spaced from said axle, said platform having a guideway and a bracket mechanism connected therewith for movement of said platform along the length of said guideway, and said bracket mechanism being pivotally connected with said transverse shaft to allow tilting of said platform in relation to said wheeled structure, a towing unit pivotally connected with said transverse shaft and extending beyond one end of said platform for connection with a pulling vehicle, and means pivotally interconnecting said towing unit and platform to effect shifting and tilting of said platform.

4. A mobile trailer comprising a platform, a wheeled structure for said platform including an axle, said structure having a transverse shaft spaced from said axle, said platform having a guideway and a bracket mechanism connected therewith for movement of said platform along the length of said guideway, and said bracket mechanism being pivotally connected with said transverse shaft to allow tilting of said platform in relation to said wheeled structure, a towing unit pivotally connected with said transverse shaft and extending beyond one end of said platform for connection with a pulling vehicle, and operable motor means pivotally interconnecting said platform and said towing unit to tilt and shift the platform relatively to said wheeled structure upon the transverse shaft thereof.

5. A mobile trailer comprising a platform, a wheeled axle structure for said platform, said structure having a transverse shaft, said platform having a guideway and a bracket mechanism connected therewith for movement along the length of said guideway, said bracket mechanism being pivotally connected with said transverse shaft to allow tilting of said platform in relation to said wheeled axle structure, locking means to fix the bracket mechanism with respect to said platform guideway, and operable means connected with said platform to tilt the same upon the transverse shaft of the wheeled axle structure, said operable means comprising a gooseneck having a hitch tongue for connection with a towing vehicle, a tail piece extending under the platform, and pivotal means for connection with said platform at a location remote from the adjacent edge of the platform.

6. A mobile trailer comprising a platform, a wheeled axle structure for said platform, said structure having a transverse shaft, said platform having a guideway and a bracket mechanism connected therewith for movement along the length of said guideway, said bracket mechanism being pivotally connected with said transverse shaft to allow tilting of said platform in relation to said wheeled axle structure, locking means to fix the bracket mechanism with respect to said platform guideway, and operable means connected with said platform to tilt the same upon the transverse shaft of the wheeled axle structure, said operable means comprising a gooseneck having a hitch tongue for connection with a towing vehicle, a tail piece extending under the platform, and pivotal means for connection with said platform at a location remote from the adjacent edge of the platform, said gooseneck having releasable latch means to fix the gooseneck in relation to said platform, and attachment means on said gooseneck for cable connection from a lifting mechanism.

7. In a trailer, a load carrying body, a hitch means to connect said body with a towing vehicle, and a wheeled carriage for said body, said carriage being bodily shiftable lengthwise relatively to said body to different selected positions intermediate the length of the body, and power operated means connecting said body and said wheeled carriage whereby to cause relative shifting movement of said carriage with respect to said body, said power operated means comprising extensible and contractible mechanism operable lengthwise of said body, and spaced aligning and stop means on said body disposed within the path of movement of said carriage and to interrupt the movement of said carriage relative to said body at a selected transportable running location and to center said carriage in predetermined transverse alignment with respect to said body to thereby arrange the carriage wheels in true tracking alignment with respect to the path of travel of said body.

8. In a trailer, a load carrying body, a hitch means to connect said body with a towing vehicle, and a wheeled carriage for said body, said carriage being bodily shiftable lengthwise relatively to said body to different selected positions intermediate the length of the body, and said hitch means comprising a draft unit having one section thereof extending forwardly and away from the adjacent front edge of said carrying body and arranged for connection with a towing vehicle, and having another section thereof extending beneath said carrying body and rearwardly with respect to said adjacent front edge of said body, and pivotal means to join said other section with said body at a location remote from the front edge of said body, said draft unit being arranged for tilting said body upon said wheeled carriage, and power operated mechanism connected with said draft unit and with said body to control the relative movements between said draft unit and said body.

9. In a trailer, a load carrying body, a hitch means to connect said body with a towing vehicle, and a wheeled carriage for said body, said carriage being bodily shiftable lengthwise relatively to said body to different selected positions intermediate the length of the body, and said hitch means comprising a gooseneck arranged for fifth wheel connection and having pivotal connection with said body, said gooseneck being arranged for tilting said body upon said wheeled carriage, and first power actuated means connecting said body and said wheeled carriage to regulate the movements of said carriage with respect to said body, and a second power actuated means connected with said gooseneck and with said body to regulate the relative movement of said gooseneck with respect to said body.

10. In a trailer, a platform, a wheeled carriage, and hitch means to secure the platform to a towing vehicle, said platform having a guideway arranged along one direction thereof, and said carriage having slide means connected for movement along said platform guideway whereby to change the relative location of said wheeled carriage along said guideway and with respect to the platform, said hitch means having a rearward extension thereon pivotally connected with said carriage, said carriage slide means including a bracket structure pivotally supported upon said carriage for movement about an axis transverse of said platform, and a power mechanism connected with said hitch means and with said platform to shift said platform relative to said carriage and to tilt said platform on said carriage about said axis.

11. In a trailer, a platform, a wheeled carriage, and hitch means to secure the platform to a towing vehicle, said platform having a guideway arranged along one direction thereof, and said carriage having slide means connected for movement along said platform guideway whereby to change the relative location of said wheeled carriage along said guideway and with respect to the platform, said hitch means having a rearward extension thereon pivotally connected with said carriage, said carriage slide means including a bracket structure pivotally supported upon said carriage, and a power mechanism connected with said hitch means and with said platform to actuate said platform relative to said carriage and to tilt said platform on said carriage, said hitch means being provided with a support member arranged as a rest for the forward end of said platform when the latter is actuated into transportable position by said power mechanism.

12. In a trailer, a load hauling body, a wheeled carriage for said body, pivotal mechanism to support said body for tilting action relative to said wheeled carriage, operable means interposed between said body and carriage to permit said carriage to shift lengthwise relative to said body and into any selected one of a number of positions intermediate the length of said body, and hitch means to connect said body with a towing vehicle comprising a gooseneck having an elevated towing tongue, a lower tail piece, and an upright unit positioned adjacent and in advance of said body and connecting said tongue and tail piece, said tail piece being arranged to project rearwardly under the forward end of said hauling body to support and to carry the adjacent end of said body upon said tail piece, and fulcrum means connecting the extended end of said tail piece with said body whereby said body and tail piece of said gooseneck are swingably separable at different selected positions of said carriage with respect to said body whenever the latter is tilted upon said carriage, and releasable locking mechanism carried by said upright unit for direct latching connection with socket means in the adjacent head end portion of said body to counteract relative movement between said gooseneck and said body thus preventing accidental tilting of said body upon said carriage.

13. In a trailer, a load hauling body, a wheeled carriage for said body, pivotal mechanism to support said body for tilting action relative to said wheeled carriage, operable means interposed between said body and carriage to permit said carriage to shift lengthwise relative to said body and into any selected one of a number of positions intermediate the length of said body, and hitch means to connect said body with a towing vehicle comprising a gooseneck having an elevated towing tongue, a lower tail piece, and an upright unit connecting said tongue and tail piece, said tail piece being arranged to project rearwardly under the forward end of said hauling body to support and to carry the adjacent end of said body upon said tail piece, and fulcrum means connecting the extended end of said tail piece with said body whereby said body and tail piece of said gooseneck are swingably separable at different selected positions of said carriage with respect to said body whenever the latter is tilted upon said carriage, and cooperative securing means connected with said hauling body and said wheeled carriage respectively to lock said carriage in a given selected position along the length of said hauling body.

14. In a trailer, a load hauling body, a wheeled carriage for said body, pivotal mechanism to support said body for tilting action relative to said wheeled carriage, operable means interposed between said body and carriage to permit said carriage to shift lengthwise relative to said body and into any selected one of a number of positions intermediate the length of said body, and hitch means to connect said body with a towing vehicle comprising a gooseneck having an elevated towing tongue, a lower tail piece, and an upright unit connecting said tongue and tail piece, said tail piece being arranged to project rearwardly under the forward end of said hauling body to support and to carry the adjacent end of said body upon said tail piece, and fulcrum means connecting the extended end of said tail piece with said body whereby said body and tail piece of said gooseneck are swingably separable at different selected positions of said carriage with respect to said body whenever the latter is tilted upon said carriage, and releasable latch mechanism interposed between said gooseneck and said hauling body to counteract relative swinging movement between the tail piece of said gooseneck and said hauling body.

15. In a trailer, a wheeled carriage, a tilting platform supported upon said carriage, and hitch means to connect said tilting platform with a pulling vehicle comprising a gooseneck having an elevated towing tongue, a tail piece connected with and spaced below said tongue and arranged in abutting underlying relation with the underside of the adjacent end of said platform to support and carry the adjacent end of said platform upon said tail piece, and fulcrum means pivotally connecting the terminal end of said tail piece with said platform whereby said tail piece and platform can swingably separate during tilting of said platform, and releasable latch means interposed between said gooseneck and said trailer platform to counteract relative swinging movement between said gooseneck and said platform when said latch means is disposed in operative latching position, said latch means comprising a bar slidable in the fore and aft direction of said gooseneck and platform, and said platform having a longitudinal cavity in the head end thereof for the reception of said bar.

References Cited in the file of this patent

UNITED STATES PATENTS

| | | |
|---|---|---|
| 2,196,338 | McDaniel | Apr. 9, 1940 |
| 2,331,713 | Mosling | Oct. 12, 1943 |
| 2,332,326 | Lex | Oct. 19, 1943 |
| 2,365,884 | Kucera | Dec. 26, 1944 |
| 2,389,211 | Pointer | Nov. 20, 1945 |
| 2,466,452 | Lisota | Apr. 5, 1949 |
| 2,493,236 | Dunstan | Jan. 3, 1950 |
| 2,496,437 | Bramble | Feb. 7, 1950 |
| 2,545,584 | Meadows | Mar. 20, 1951 |
| 2,572,636 | Le Tourneau | Oct. 23, 1951 |
| 2,653,827 | Manning | Sept. 29, 1953 |

FOREIGN PATENTS

| | | |
|---|---|---|
| 726,877 | France | Mar. 14, 1932 |
| 760,730 | France | Dec. 27, 1933 |